C. H. HORTON.
Grain-Tally.

No. 217,220.

Patented July 8, 1879.

WITNESSES
E H Bates
John F Acker

INVENTOR
Charles H Horton
Gilmore & Co.
ATTORNEYS

C. H. HORTON.
Grain-Tally.
No. 217,220.    Patented July 8, 1879.
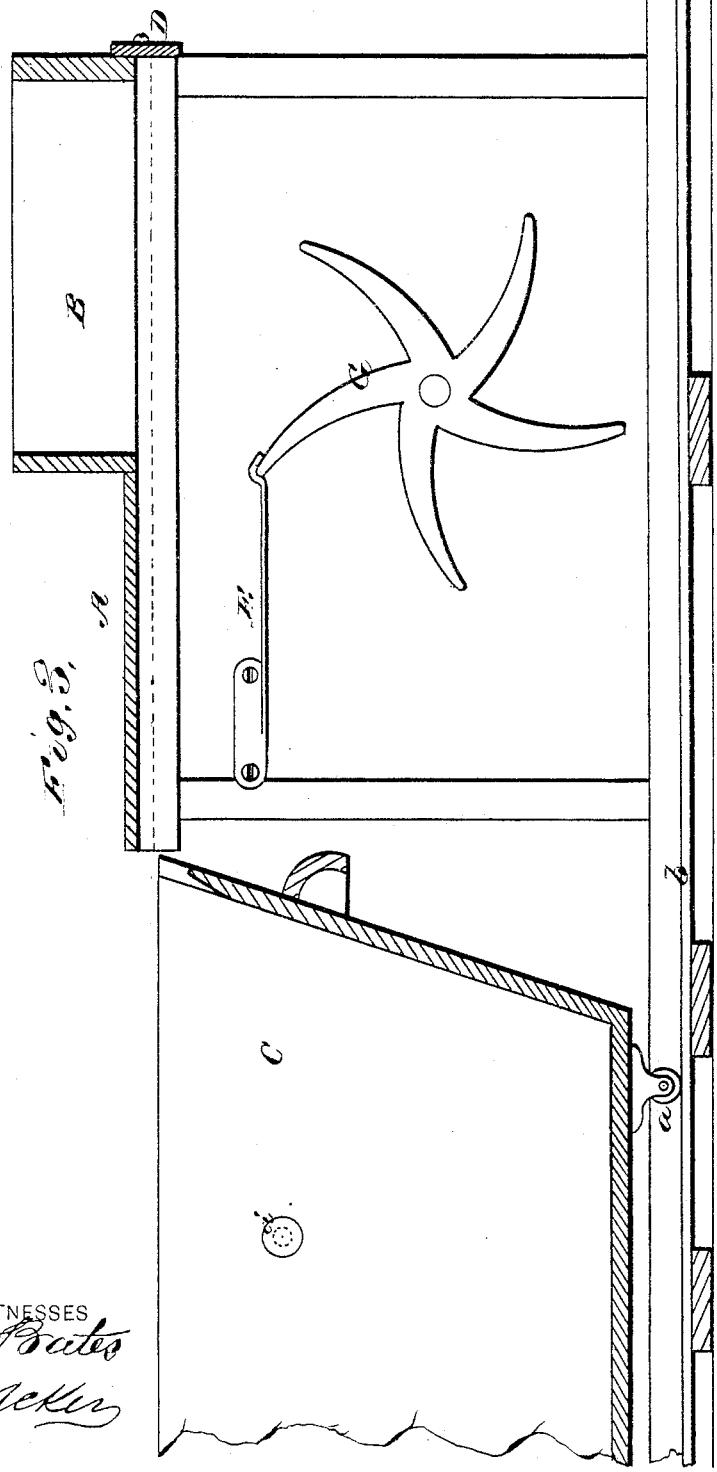
WITNESSES
INVENTOR
C. H. Horton
Gilmore & Co.
ATTORNEYS 3 Sheets—Sheet 3.
C. H. HORTON.
Grain-Tally.
No. 217,220. Patented July 8, 1879.
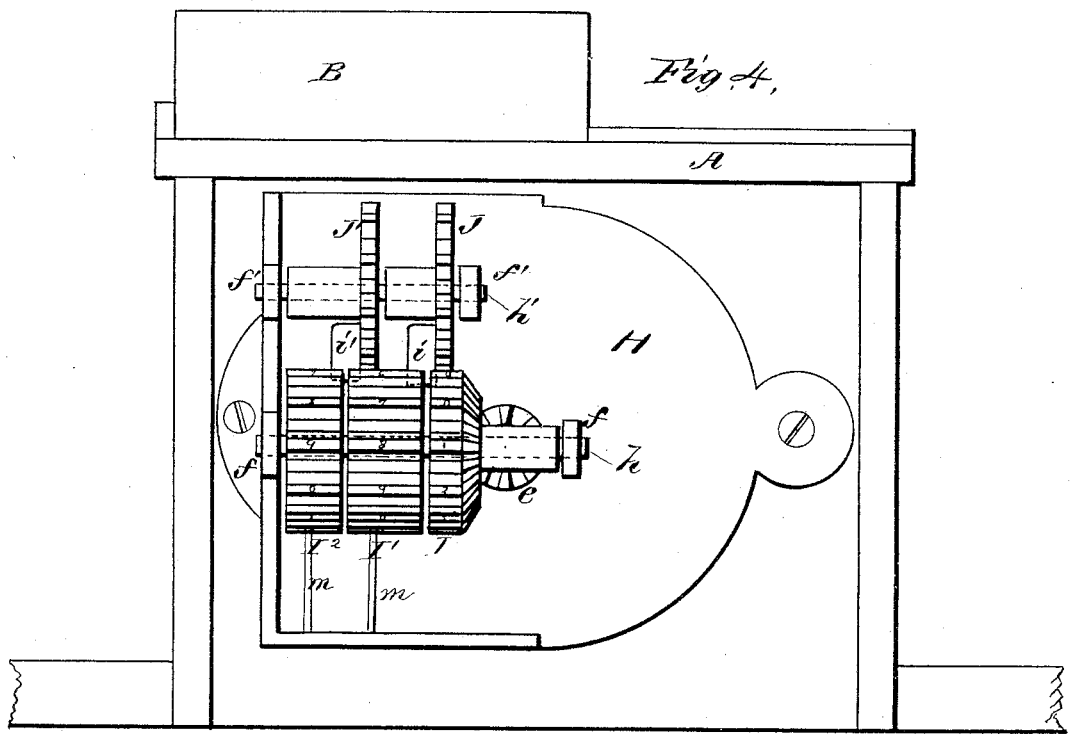
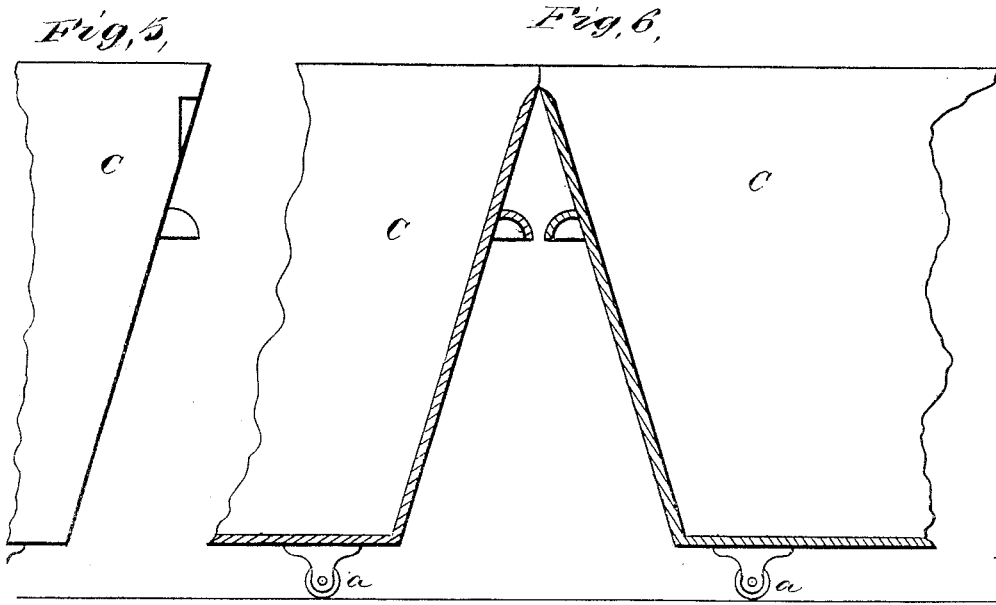
WITNESSES
INVENTOR
ATTORNEYS

UNITED STATES PATENT OFFICE

CHARLES H. HORTON, OF ROCHESTER DEPOT, OHIO.

IMPROVEMENT IN GRAIN-TALLIES.

Specification forming part of Letters Patent No. 217,220, dated July 8, 1879; application filed May 20, 1876.

*To all whom it may concern:*

Be it known that I, CHARLES H. HORTON, of Rochester Depot, in the county of Lorain and State of Ohio, have invented a new and valuable Improvement in Measuring and Registering Grain; and I do hereby declare that the following is a full, clear, and exact description of the construction and operation of the same, reference being had to the annexed drawings, making a part of this specification, and to the letters and figures of reference marked thereon.

Figure 1:
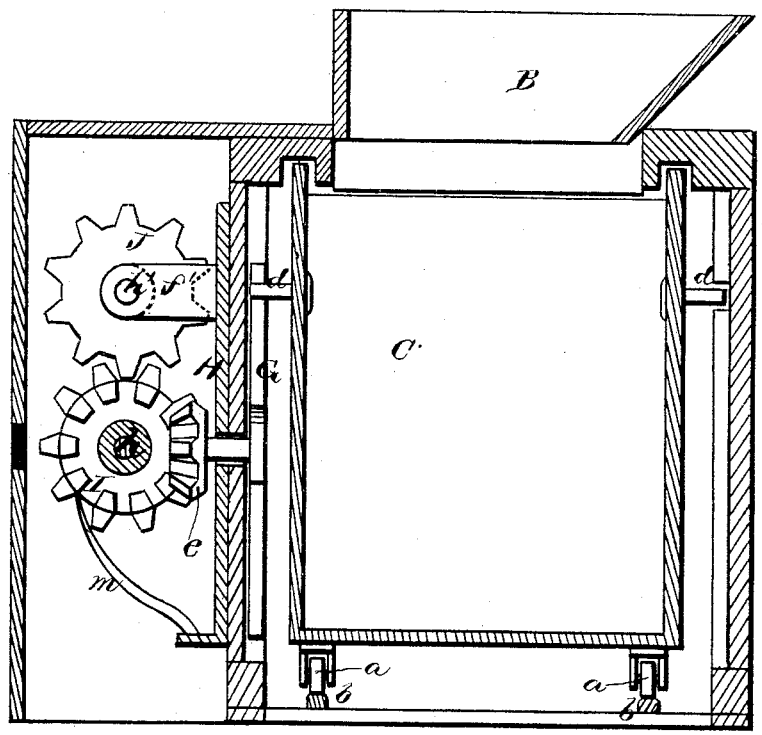
Figure 2:
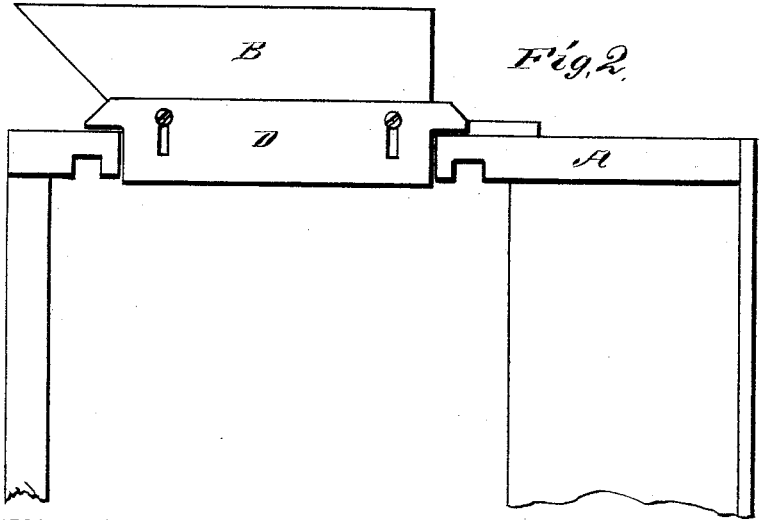

Figure 1 of the drawings is a representation of a transverse vertical section of my grain register and measurer, and Fig. 2 is a detail view thereof. Fig. 3 is a longitudinal vertical sectional view of the same. Fig. 4 is a side elevation, and Figs. 5 and 6 are detail views.

The nature of my invention consists in the construction and arrangement of an apparatus for measuring and registering grain, as will be hereinafter more fully set forth.

This invention relates to certain improvements upon the grain-register forming the subject-matter of an application for Letters Patent filed by me June 11, 1874, and, like my previous invention, has for its object to avoid the use of pawls and ratchet-wheels in a registering-machine, which are objectionable, owing to the necessity of using retractile springs, which soon become inoperative, due to the frequent jarring given by the blows of the traveling measure which operates the registering mechanism.

In the annexed drawings, A represents a frame-work containing a hopper, B, through which the measures C C are filled. These measures are constructed, as shown, with inclined ends, and provided under the bottom with rollers $a$ $a$ to run on a track, $b$.

The ends of the measures being inclined gives room for handles, and yet allows them to be pushed together close at the upper edges as they pass under the hopper. At the side of the hopper B, where the measures C emerge after being filled, is a vertically-sliding stick, D, to rake off all surplus grain and carry the same backward into the next measure, the frame-work being so constructed that the upper edges of the sides of the measure slide in grooves, forming cut-offs to prevent any grain from falling off at the sides.

From the side of the measure C projects a pin, $d$, which, as the measure passes under the hopper, strikes a five-armed wheel, G, and turns the same one-fifth of a revolution. A flat spring, E, having its outer free end recessed grooved, or depressed, is so arranged to act upon the arms of the wheel G that if the measure is started the wrong way the wheel cannot be turned.

The wheel G is secured on a short shaft passing through the front of the frame, and has its bearings in a casting, H, secured to said frame, and on the front end of the wheel-shaft is secured a pinion, $e$, which meshes with a bevel cog-wheel, I, having ten cogs, numbered from 0 to 9. This wheel is placed loosely on a shaft, $h$, having its bearings in ears $f f$, projecting from the plate H. Above the same are other ears, $f' f'$, holding a shaft, $h'$, upon which are placed two cog-wheels, J J$^1$. The shaft $h$ carries also two other cog-wheels, I I$^2$, all the cog-wheels being formed with ten cogs. The wheel I meshes with J, and I$^1$ with J$^1$, as shown.

As the pinion $e$ turns the wheel I the distance of one cog on the wheel for each movement of the five-armed wheel G, the pinion $e$ having only five cogs, the wheel J is also turned the distance of one cog. On the side of the wheel J is a single cog, $i$, which turns the wheel I$^1$ the distance of one cog once for each revolution of the wheel J, and at the same time the wheel J$^1$ is turned the distance of one cog. On the side of this wheel J$^1$ is another single cog, $i'$, which in like manner turns the wheel I$^2$ one cog for each revolution of the wheel J$^2$.

The cog-wheels I I$^1$ I$^2$ are provided with bands or numbers from 1 to 10, forming a complete register, to show how many measures have been passed through the machine.

The registering apparatus is inclosed in a box having suitable apertures, through which the numbers are visible.

The wheels I$^1$ I$^2$ are provided with springs $m$ $m$, to prevent them turning the wrong way, the spring E, acting on the wheel G, performing the same function for the wheel I.

What I claim as new, and desire to secure by Letters Patent, is—

In a grain-registering apparatus having an inclosed passage-way for a traveling measure provided with a projection or lug, the combination therewith of the armed wheel adapted to be rotated by the projection or lug on the measure, a flat spring having a free end recessed to engage the ends of the arms of the said wheel, the bevel-pinion $e$ on the shaft of the latter, the bevel-gear wheel I, and the lower and upper gear-wheels, $I^1$ $I^2$ and J $J^1$, the two upper wheels having side projections, $i$ $i'$, for actuating the two lower wheels, and each of said gear-wheels provided with numbers from 1 to 10 on their periphery, all substantially as and for the purpose herein set forth.

In testimony that I claim the above I have hereunto subscribed my name in the presence of two witnesses.

C. H. HORTON.

Witnesses:
R. M. CRANDALL,
W. M. CRANDALL.